United States Patent [19]

Haneline, Jr. et al.

[11] Patent Number: 4,780,163

[45] Date of Patent: Oct. 25, 1988

[54] METHOD FOR LINING PIPELINE

[75] Inventors: Bryan L. Haneline, Jr., Houston; Burnice Black, Jr., Angleton, both of Tex.

[73] Assignee: The Dow Chemical Company, Midland, Mich.

[21] Appl. No.: 81,514

[22] Filed: Aug. 5, 1987

[51] Int. Cl.$^4$ ............................................. B32B 35/00
[52] U.S. Cl. ...................................... 156/94; 156/156; 156/281; 156/285; 156/294; 156/304.2; 264/269; 264/270
[58] Field of Search ...................... 156/94, 281, 304.2, 156/304.6, 155–156, 293–294, 244.13, 285, 303.1, 281; 29/402.07, 402.13, 402.16; 138/97; 228/104, 119; 264/267, 500, 269, 566, 270, 259, 261

[56] References Cited

U.S. PATENT DOCUMENTS

| | | | |
|---|---|---|---|
| 3,114,395 | 12/1963 | Immel | 138/97 |
| 3,406,987 | 10/1968 | Hundar et al. | 138/97 |
| 3,929,541 | 12/1975 | Spears et al. | 156/304.2 |
| 4,049,480 | 9/1977 | Kutschke | 156/94 |
| 4,352,708 | 10/1982 | McElroy | 156/304.2 |
| 4,496,499 | 1/1985 | Brittain et al. | 156/94 |

FOREIGN PATENT DOCUMENTS 142617  11/1980  Japan ................... 156/304.2

Primary Examiner—Merrell C. Cashion, Jr.

[57] ABSTRACT

A method of lining pipes by providing a predetermined distance of pipeline with a first and second end; forming at least one closure point in the pipeline by cutting at least one section of the pipeline forming at least a first and second section of the pipeline and at least one cut-out section of pipeline; pushing or pulling a first liner segment through the first section of pipeline to the closure point; pushing or pulling the second liner segment through the second section of the pipeline through to the closure point; contacting the two liner segments together at the closure point; fusing the two liner segments together at the closure point; insulating the exposed liner surface at the closure point; and welding the cut out section of pipeline to the first and second sections of pipeline.

9 Claims, 2 Drawing Sheets

METHOD FOR LINING PIPELINE

BACKGROUND OF THE INVENTION

This invention relates to a method of lining pipeline also referred to as "sliplining".

"Sliplining" refers to a procedure of inserting a pipe or liner inside a pipeline by pushing or pulling the liner (typically made of plastic) through the inside of the pipeline (typically made of steel). In the pipeline industry sliplining a steel pipeline with a plastic liner is usually carried out to obtain the corrosive resistance advantage of the plastic piping system and the structural strength advantage of the steel piping system.

U.S. Pat. No. 4,496,499 teaches a method for lining high pressure pipeline with a plastic liner by first drawing the liner into the pipeline section by pulling the liner from one end area of the pipeline through the pipeline section until the liner is longitudinally co-extensive with the pipeline section. Before concluding the drawing step, a liner flange is affixed to the end of the liner opposite the end being pulled and then the drawing is completed to position the liner flange against a first pipeline flange. Then, the liner is longitudinally stretched within the pipeline section by elongating the liner without exceeding the elastic limit of the liner by pulling the one end area of the liner beyond the length of the pipeline section while the first liner flange prevents longitudinal movement of the opposite end of the liner along the pipeline section. After the stretching step, a second liner flange is affixed to the one end area of the liner segment opposite the first liner flange to position the second liner flange against a second pipe flange by permitting the liner to elastically retract into the pipeline section. A warm pressurized fluid is pumped through the liner to radially expanded the liner against the inside wall of the pipeline to an extant to permanently change the liner outside diameter from its original size to a size conforming to the inside diameter of the pipeline. A bleeder port is placed in pipeline section to evacuate the spaces between the liner and pipeline upon expansion of the liner by forcing air, water and other impurities through the bleeder port.

Using the method of U.S. Pat. No. 4,496,499 it is required to affix two flange members on each liner segment used for each pipeline section being lined. When several sections of pipeline are to be lined a multitude of flange points can exist along a pipeline route. There is a greater likelihood for leakage to occur at each flange point. Therefore, the more flanges used, the problem of leakage increases and for ecological and safety reasons it would be desirable to eliminate as many flange points along a pipeline as possible and provide a pipeline system containing a minimum number of flange points.

It is, therefore, desired to minimize the number of flanges used in a pipeline system when lining the pipeline and to provide a novel method of lining pipeline with a plastic liner.

SUMMARY OF THE INVENTION

This invention is directed to a method of lining pipeline by providing a predetermined distance of pipeline with a first and second end; forming at least one closure point in the pipeline comprising cutting at least one predetermined section of the pipeline forming at least a first and second section of pipeline and at least one cutout section of pipeline; pushing or pulling a first liner segment through the first section of pipeline to the closure point; pushing or pulling the second liner segment through the second section of the pipeline to the closure point; contacting the two liner segments together at the closure point; fusing the two liner segments together at the closure point; insulating the liner surface exposed to the atmosphere at the closure point; and welding the cut out section of pipeline to the first and second sections of pipeline.

BRIEF DESCRIPTION OF THE DRAWINGS

FIG. 4 is a cross-sectional view taken along line 4—4 of FIG. 6.

DETAILED DESCRIPTION OF THE PREFERRED EMBODIMENTS

In accordance with the process of the present invention, and with reference to FIG. 1-4, a predetermined length of pipeline, generally indicated by numeral 10, is selected to be lined with a plastic liner, generally indicated by numeral 20. The liner used in the present invention is preferably made of a polyethylene plastic in a firm, tubular, form-sustaining configuration (i.e. plastic pipe) which may be field-assembled into segments. Preferably, a high density polyethylene is used and, more particularly, a liner material which meets Plastic Pipe Institute designation P.E. 3406 and 3408. A suitable liner material used may be, for example, the liner material disclosed in U.S. Pat. No. 4,496,499. The liner material used may be, for example, liner material manufactured by Phillips Driscopipe, Inc. under the trademark Driscopipe ® 8600 and Driscopipe ® 9100. Suitable liner material manufactured by DuPont Canada, Inc. under the trademark Sclairpipe ® or PE 3408 extra high density polyethylene industrial piping sold by Plexco, (Amsted Industries, Inc.) under the trademark Plexco ® may also be used.

Figure 1:
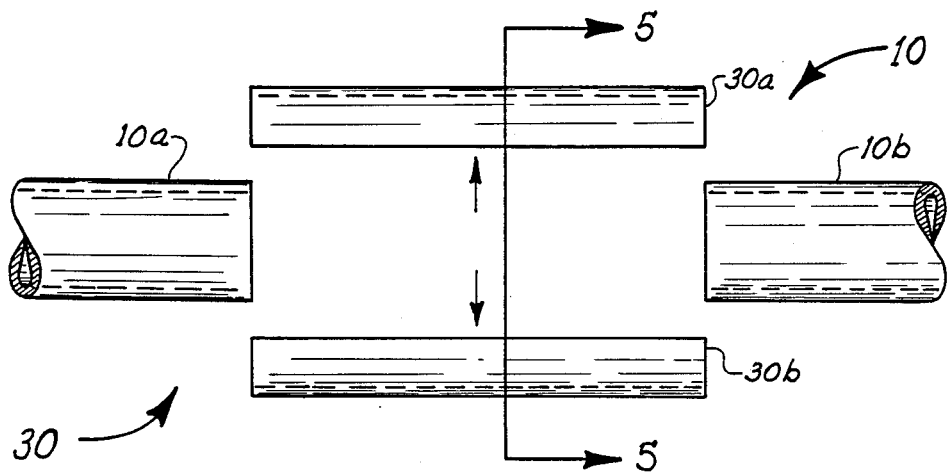
FIG. 1 is a side, partially exploded, view showing a pipeline with a section cut out and the cut out section further cut into two portions.

Before the liner is installed into the pipeline, a suitable "closure point" is determined along the pipeline route. By "closure point" herein it is meant a point on the pipeline wherein a section of the pipeline is cut out and the cutout section of pipeline is later reattached by welding in accordance with the present process. At the closure point at least one predetermined section of the pipeline 10 is cut out to form a cutout section, generally indicated by numeral 30, which is further cut into two sections 30a and 30b. The cutout section 30 is cut in half along the longitudinal axis of the cutout section 30 to form the two half portions 30a and 30b. As a result of cutting out the section 30 from the pipeline 10 at least two pipeline sections 10a and 10b as shown in FIG. 1 are also formed.

Any one pipeline system can contain more than one closure point and cutout sections forming a plurality of pipeline sections. The length of the pipeline sections 10a and 10b can vary but it is preferred that the pipeline sections be no greater than about 2000 feet in length.

The next step in the process of the present invention is to insert a liner segment 20a and 20b in each section of the pipeline 10a and 10b, respectively, by conventional techniques used in the art such as a "pull" insertion technique or a "push" insertion technique. The pulling technique involves using, for example, a "pig" to install a cable through the pipeline, a pulling head attached to the cable and to one end of the liner material, and a winch attached to the cable to pull the liner through the pipeline section. The pushing technique involves using, for example, a "choker cable" attached to the line material and a "backhoe" for pushing the liner through the pipeline section. The "choker cable" and "backhoe" are conventional pieces of equipment known in the art. Before the liner is inserted into a pipeline by either the pushing or pulling technique, the pipeline section should be depressurized, purged and cleaned if necessary.

Generally, for insertion, the outside diameter of the liner material, i.e. the plastic pipe, must be smaller than the inside diameter of the pipeline section, i.e. the steel pipe. When using the pipeline as a routing or pathway member and no expansion of the liner pipe is to take place, i.e. the liner will be used as a free-standing pipeline, then the diameter of the liner is not critical. The only requirement in this instance is that the diameter of the liner material be smaller than the pipeline section for the liner to be inserted in the pipeline section. A freestanding plastic pipeline within another metal pipeline type of system is used in low pressure applications. In high pressure applications, for example, from about 300 to about 400 psig, expansion of the liner material is expected. The clearance between the diameter of the liner and pipeline has to be small enough to oontain the plastic pipe below its burst limit when the plastic pipe is pressured beyond its yield. Therefore, the difference in diameters between the inside diameter of the pipeline section and the outside of the liner material before expansion, should be about 10% or less, but the diameter difference should be large enough to allow insertion of the liner through the pipeline. For even higher pressures, for example, above about 400 psig, the tolerances between liner and pipeline diameters should be decreased.

Figure 2:
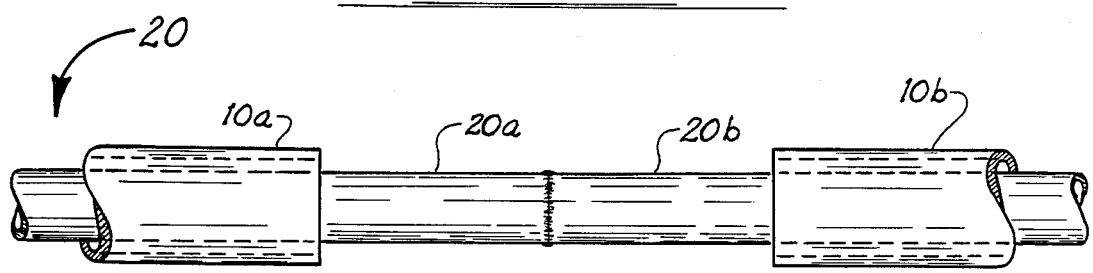
FIG. 2 is a side view showing the two sections of pipeline of FIG. 1 with two liner segments disposed inside the two sections of pipeline and showing the liner segments fused together.
Figure 3:
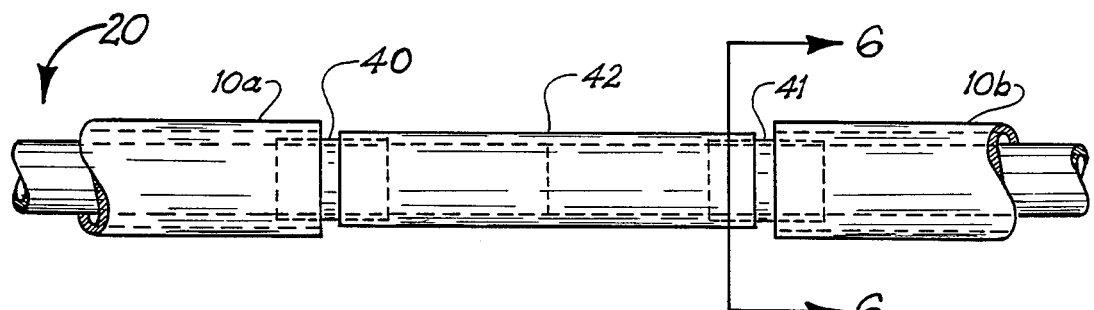
FIG. 3 is a side view showing several heat shield-insulation members wrapped around the two liner segments of FIG. 2 which have been fused together.

As aforementioned, in the process of slip-lining, for example, a steel pipe with plastic pipe, a section of steel pipe must be left open, i.e. a closure point must be made in the steel pipe, in order to pull or push the plastic pipe through the steel pipe. In this instance, for example, one plastic pipe or liner segment 20a is pushed from one of its ends through one of the steel pipeline sections 10a to the closure point and then the other liner segment 20b is pushed from one of its ends through the other pipeline section 10b to the closure point in an overlapping manner with the liner segment 10a to insure that enough liner material is present at the closure point to work with. Excess liner material can then be cut away from liner segment 20a and/or 20b and the two ends of the segments 20a and 20b at the closure points, are then fused together as shown in FIG. 2. Alternatively, an exact measurement of the two liner segments 20a and 20b can be made such that when the two segments are pulled though the pipeline, the two ends of the segments 20a and 20b will abut flush against each other at the closure point and then the ends are fused together. For fusing the plastic liner ends together conventional fusing equipment oan be used, for example fusing equipment manufactured by McElroy Manufacturing, Inc. of Tulsa, Okla. and sold under the tradename McElroy No. 412 Hydraulic Fusion Unit.

Figure 4:
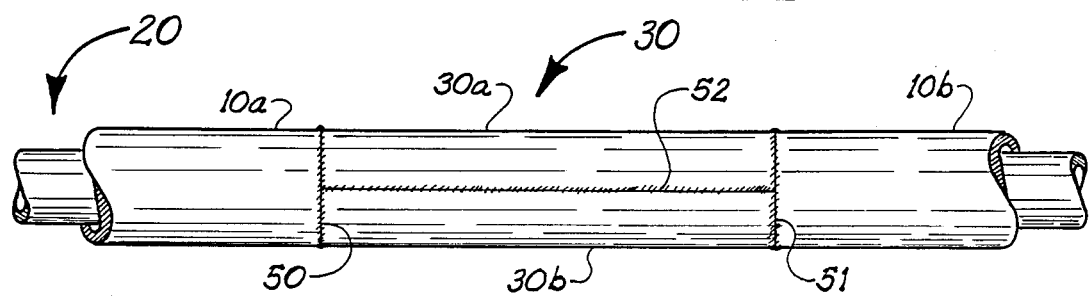
FIG. 4 is a side view showing the two halves of the cut-out section of pipeline of FIG. 1 welded together and welded to the two sections of pipeline and having a liner disposed inside the pipeline.
Figure 5:
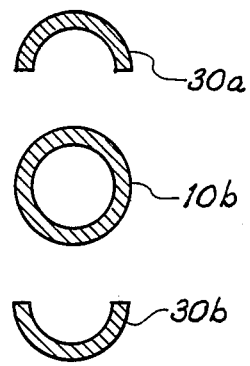
FIG. 5 is a cross-sectional view taken along line 2—2 of FIG. 1.
Figure 6:
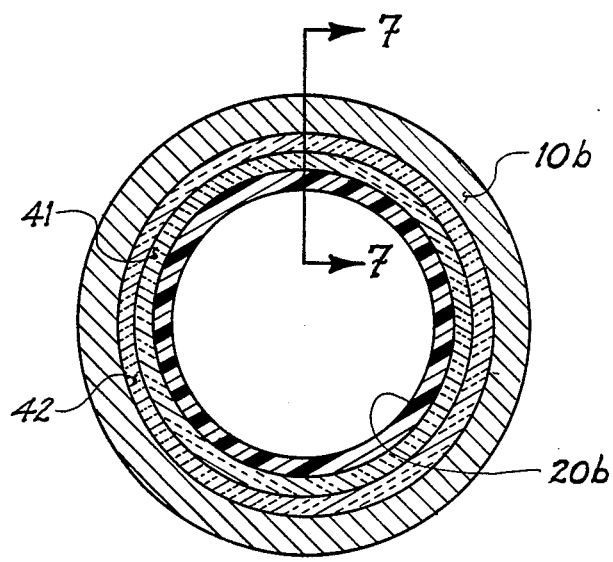
FIG. 6 is a cross-sectional view taken along line 3—3 of FIG. 3.

After the liner segments 20a and 20b are fused together, the cutout section 30 must then be reattached to the two pipeline sections 10a and 10b to insure the integrity of the pipeline system. Welding the sections 30a and 30b to the pipeline 10a and 10b is the preferred manner of attachment. Conventional welding techniques, for example, shielded metal arc welding, can be used. In order to insure that the plastic pipe liner is not destroyed by the welding technique, heat shield-insulation members 40, 41 and 42 are interposed between the liner 20 and the pipeline section 30. Heat shield-insulation members 40 and 41 are interposed between the ends of the pipeline sections 10a and 10b, respectively, and the liner 20. The heat shield-insulation members 40 and 41 protect the liner 20 during the circumference welding 50 and 51 (shown in FIG. 4) around the joint between the cutout section 30 and the pipeline 10a and 10b, respectively. Heat shield-insulation member 42 protects the liner 20 during welding along the horizontal cut 52 (shown in FIG. 4) of the cutout section 30 when reattaching the two halved portions 30a and 30b together. Some overlap of the heat shield-insulation members is preferred to insure that the entire liner 20 in the area of welding is protected. FIG. 4 shows the pipeline cutout section 30 reattached to the pipeline sections 10a and 10b at weld joints 50, 51 and 52.

Figures 7, 8:
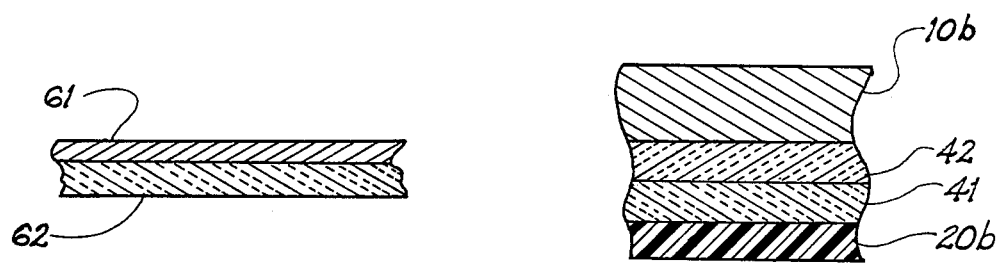
FIG. 8 is an enlarged non-sectional view of a portion of the heat shield-insulation member of the present invention.

A heat shield-insulation member which can protect the plastic liner material at temperatures from the use of welding is preferred. The heat shield-insulation member protects the plastic pipe liner from the heat of welding when replacing the open section of the metal pipe. With reference to FIG. 8, the heat shield-insulation member, in this instance, can be for example, a combination of two sheet members 61 and 62. The first sheet member 61 is a metal sheet member, for example, a stainless steel metal sheet with a thickness of at least about 0.025 inches. The second sheet member 62 is conventional high temperature insulation material, for example, a ceramic fiber paper sold under the tradename Fiberfrax 550 Paper by Sohio Engineering Materials Company, Fibers Division. The thickness of the ceramic paper is preferably at least $\frac{1}{4}$ inch. The ceramic fiber paper has continuous use temperatures of up to about 1260° C.

The process of the present invention is particularly useful for insertion of a plastic liner into a pipeline which is buried in situ. It is to be understood however, that the method is of general application and may be used with pipelines or pipeline sections which are not buried.

When sliplining a buried pipe it is important to first determine the "tie-in points" along the pipeline route. A "tie-in point" herein means a point at which the pipeline may be uncovered and broken to create a plurality of pipeline sections. A tie-in point can be equivalent to a closure point but a closure point does not necessarily have to be a tie-in point. A tie-in point will generally be the point where the pipeline will contain a flange member. At the closure point, the liner and pipeline will not have a flange member. At these tie-in points and closure points the pipeline may be uncovered by excavating a hole around the pipeline referred to by those skilled in the art as a "bellhole." A section of the uncovered pipeline at the closure points is then cut out to form a cutout section and at least two pipeline sections. The closure points provide access to the liner for fusing together the liner ends once the liner has been pushed or pulled through the two pipeline sections through the tie-in points. The number of tie-in points will vary depending upon the shape of the pipeline such as straight pipeline or bends in the pipeline and the conditions along the pipeline right of way such as bodies of water, roadways, and rail crossings. Typically, it preferred to fuse together two sections of about 2000 feet of liner together when a continuous straight pipeline is available. Otherwise a tie-in point and/or closure point is preferred before and after a bend in the pipeline.

The following example further illustrates the present invention.

EXAMPLE 1

A test steel pipe spool consisting of a flanged steel pipe 14 inches in diameter and 8½ feet long, was lined with a plastic liner (Driscopipe 8600 made by Phillips Petroleum) as follows:

A 3 foot section of the steel pipe was cut out and this section was further cut into two halves longitudinally. One flanged segment of plastic liner was inserted into one section of the steel pipe by pulling the segment from one end of the section of the steel pipe. Another flanged segment of plastic liner was inserted into the other section of the steel pipe such that both segments of liner contacted each other at the open section of pipeline. The two liner segments were then fused together. A heat shield-insulation material consisting of 24 gauge stainless steel and ⅛ inch thickness of ceramic fiber paper insulation (Fiberfrax 550 paper) was wrapped around the liner exposed to the atmosphere. Then the 3 foot cutout section of pipeline was placed around the heat shield-insulation material and welded together and welded to the two sections of pipeline. A 2 inch by ¼ inch gap was left on a welding joint for visually determining whether expansion of the lines occurred.

The pipeline was then hydrostatically tested with water at 500 psig. The pressure was held for 72 hours. No leaks and no decrease in pressure in the pipe system was detected after the plastic pipe had expanded to the inside diameter of steel pipe system.

After the system was depressurized, a section of the steel pipe was again cut and the section removed for visual inspection. The plastic pipe was observed to have expanded to the inside diameter of the steel pipe and no damage to the plastic pipe due to welding was seen.

What is claimed is:

1. A method of lining pipeline so as to reduce the number of required flanges comprising:
   a. providing a predetermined distance of pipeline with a first and second end;
   b. forming at least one closure point in the pipeline between said first and second end of the pipeline, said closure point comprising cutting at least one predetermined section of the pipeline between said first and second end of the pipeline forming at least a first and second section of pipeline and at least one cutout section of pipeline;
   c. pushing pulling a first liner segment through the first section of pipeline to the closure point;
   d. pushing or pulling a second linear segment through the second section or the pipeline to the closure point;
   e. contacting the two liner segments together at the closure point;
   f. fusing the two liner segments together at the closure point;
   g. wrapping a heat shield-insulation material around the linear surface exposed to the atmosphere at the closure point; and
   h. reattaching the cutout section to the pipeline by welding the cutout section together with the first and second sections of the pipeline whereby the predetermined distance of pipeline with a first and second end is reformed and the heat shield-insulation material protects the liner from the heat of welding.

2. The process of claim 1 including the step of leaving a gap in the welding open to the atmosphere.

3. The process of claim 2 including the step of flowing a fluid material through the inside diameter of the linear to expand the liner at a certain temperature and pressure to contact the inside diameter of the pipeline such that the annular space between the outside diameter of the linear and the inside diameter of the pipeline is bled of any material within the annular space to the atmosphere.

4. The process of claim 3 including the step of closing the gap on the welding points to seal the pipeline.

5. A method of lining pipeline so as to reduce the number of required flanges comprising:
   a. providing a predetermined distance of pipeline with a first and second end;
   b. surveying the pipeline to determine where closure points will be made;
   c. locating and exposing the pipeline at its first and second ends and at the closure point by digging a bell hole;
   d. forming at least one closure point in the pipeline between said first and second end of the pipeline, said closure point comprising cutting at least one predetermined section of the pipeline between said first and second end of the pipeline forming at least a first and second section of pipeline and at least one cutout section of pipeline;
   e. fusing a flange to one end of a first liner segment;
   f. pushing or pulling a first liner segment through the first section of pipeline such that the flange is abutting the flange of the second section of pipeline extending to the end of the section to the closure point;
   g. fusing a flange to at least one end of the second liner segment;
   h. pushing of pulling the second liner segment through the second section of the pipeline such that the flange is abutting the flange of the second section of pipeline extending to the end of the section to the closure point;
   i. cutting at least one the segments to a predetermined length such the the two segments are contacting flush with each other;
   j. contacting the two liner segments together at the closure point;

k. fusing the two liner segments together at the closure point;
l. wrapping a heat shield-insulation material around the liner surface exposed to the atmosphere at the closure point;
m. reattaching the cutout section to the pipeline by welding the cutout section together with the first and second section of the pipeline whereby the predetermined distance of piepline with a first and second end is reformed and the insulation material protects the liner from the heat of welding.

6. A closure method used in lining pipeline so as to reduce the number of required flanges comprising:
   a. providing a predetermined distance of metal pipeline with a first and second end;
   b. forming at least one closure point in the metal pipeline between said first and second end of the pipeline, said closure point comprising cutting at least one predetermined section of the pipeline between said first and second end of the pipeline forming at least a first and second section of pipeline and at least one cutout section of pipeline;
   c. providing a plastic pipe concentrically disposed inside the two spaced apart sections of metal pipeline leaving a section of plastic pipe exposed to the atmosphere;
   d. wrapping a heat shield-insulation material around the outside diameter of the plastic pipe exposed to the atmosphere and for a predetermined length from the ends of the two sections of metal pipeline between the outside diameter of the plastic pipe and the inside diameter of the metal pipe;
   e. placing two halved members of the pipe section over and around the insulating material to cover the plastic pipe open to the atmosphere; and
   f. reattaching the cutout section to the metal pipeline by welding the two metal halved members together and to the two sections of metal pipeline whereby one continuous section of pipeline is formed and the heat shield-insulation material protects the plastic pipe form the heat of welding.

7. The method of claim 6 wherein the metal pipe is steel.

8. The method of claim 6 including the step of inspecting the welds.

9. The method of claim 6 including the steps of cleaning the surface at the welds and applying a corrosive protective surface coating on the welds.

* * * * *